(12) United States Patent
Altura (10) Patent No.: US 12,416,516 B2
(45) Date of Patent: Sep. 16, 2025

(54) MICROMETER AND A SYSTEM FOR WATER-FLOW MONITORING

(71) Applicant: DRIZZLEX LTD., Jerusalem (IL)

(72) Inventor: Ariel Altura, Jerusalem (IL)

(73) Assignee: DRIZZLEX LTD., Tel Aviv (IL)

( * ) Notice: Subject to any disclaimer, the term of this patent is extended or adjusted under 35 U.S.C. 154(b) by 563 days.

(21) Appl. No.: 17/782,326

(22) PCT Filed: Nov. 30, 2020

(86) PCT No.: PCT/IL2020/051234
§ 371 (c)(1),
(2) Date: Jun. 3, 2022

(87) PCT Pub. No.: WO2021/117030
PCT Pub. Date: Jun. 17, 2021

(65) Prior Publication Data
US 2023/0003563 A1   Jan. 5, 2023

(30) Foreign Application Priority Data
Dec. 12, 2019   (IL) .......................................... 271409

(51) Int. Cl.
*G01F 1/58* (2006.01)
*G01D 4/00* (2006.01)
(Continued)

(52) U.S. Cl.
CPC ............ *G01F 1/586* (2013.01); *G01M 3/2807* (2013.01); *G01D 4/00* (2013.01); *G01F 1/115* (2013.01)

(58) Field of Classification Search
CPC ...... G01F 1/586; G01F 1/115; G01M 3/2807; G01D 4/00
See application file for complete search history.

(56) References Cited

U.S. PATENT DOCUMENTS

| 5,892,158 A | 4/1999 | Franklin et al. |
| 5,986,573 A | 11/1999 | Franklin et al. |

(Continued)

FOREIGN PATENT DOCUMENTS

| CN | 203745017 U | 7/2014 |
| CN | 107402051 U | 11/2017 |

OTHER PUBLICATIONS

PCT International Search Report for International Application No. PCT/IL2020/051234, mailed Feb. 21, 2021, 5pp.

(Continued)

*Primary Examiner* — Peter J Macchiarolo
*Assistant Examiner* — John M Royston
(74) *Attorney, Agent, or Firm* — The Roy Gross Law Firm, LLC; Roy D. Gross (57) ABSTRACT

A system for water-flow monitoring comprising at least one micrometer, a gateway and a server, wherein the micrometer comprising: a housing, an inner tubular member, a rotating member, a sensing module, a transmission module, a power unit, a memory, and a processor, and wherein the tubular member is located inside the housing, and have an in and out connecting means and wherein the connecting means is connected to a distributing conduit on one side and associated with a water-flow outlet on the other side, and wherein the rotating member is designed to rotate upon the flow of water through said tubular member, and the sensing module is sensing the amount of water flow through the micrometer to said water-flow outlet, with accordance to the rotation of said rotating member, and wherein the micrometer is designed to have a hibernation mode, said hibernation mode starts according to a predefined condition and is terminated upon the sensing of water flow.

19 Claims, 7 Drawing Sheets

(51) Int. Cl.
    *G01F 1/115*    (2006.01)
    *G01M 3/28*     (2006.01)

(56) References Cited

U.S. PATENT DOCUMENTS

| | | | |
|---|---|---|---|
| 8,994,551 B2 | 3/2015 | Pitchford et al. | |
| 2006/0245467 A1* | 11/2006 | Casella | H04Q 9/00 |
| | | | 374/41 |
| 2010/0085211 A1* | 4/2010 | Wang | G01F 15/063 |
| | | | 340/870.02 |
| 2013/0080081 A1* | 3/2013 | Dugger | G01F 15/063 |
| | | | 73/861.25 |
| 2013/0199619 A1* | 8/2013 | Naquin | F16K 17/24 |
| | | | 137/12 |
| 2016/0334255 A1* | 11/2016 | Gestner | G01F 1/667 |
| 2017/0184417 A1* | 6/2017 | Pedreiro | G01D 4/002 |
| 2017/0234709 A1* | 8/2017 | Mackie | G01M 3/243 |
| | | | 73/861.08 |
| 2017/0370754 A1* | 12/2017 | Croteau | G01F 1/075 |
| 2018/0328007 A1* | 11/2018 | Ross | G01F 15/06 |
| 2019/0234786 A1* | 8/2019 | Klicpera | G01M 3/26 |

OTHER PUBLICATIONS

PCT Written Opinion for International Application No. PCT/IL2020/051234, mailed Feb. 21, 2021, 6pp.

\* cited by examiner

MICROMETER AND A SYSTEM FOR WATER-FLOW MONITORING

This application is a National Phase of PCT Patent Application No. PCT/IL2020/051234 having International filing date of Nov. 30, 2020, which claims the benefit of priority of Israeli Patent Application No. 271409, filed Dec. 12, 2019, the contents of which are all incorporated herein by reference in their entirety.

FIELD OF THE INVENTION

The present invention is in the field of water-flow monitoring and management and relates to a system for the monitoring of water-flow in facilities having a plurality of water outlets.

More specifically, the present invention relates to a system for monitoring and identifying water-flow (by means of leaks or usage of such outlets) in large, multi-unit housing or commercial complexes.

BACKGROUND OF THE INVENTION

Monitoring water-flow in facilities having a large number of water outlets such as apartments, condominiums, and office buildings is of environmental and economic importance.

A lot of apartment buildings and condominiums are constructed with no central outlet for each apartment, a construction that prevents metering the water-flow used by every individual housing unit. Usually, a single central water-flow meter is installed in the mainline distributing water to the building, and water usage is billed to the condominium or apartment owner or managing company, based on the overall usage of water consumed by all households, as measured by the central meter.

Consequently, the overall cost of water is shared equally or allocated based on a pro-rata share of the total living area, regardless of the actual quantity of water consumed in each housing unit. In those arrangements, individual tenants do not pay the actual price of excessive, wasteful, or inefficient water usage habits. Nor is there an economic reward to individual tenants who implement water-saving practices.

The same applies to the subject of inhouse leaking water outlets, which are often overlooked due to wasteful water consumption habits, tended to develop.

The water crisis and the resultant water expenses, is driving property owners and managing societies to employ any possible water conservation means.

Where it is possible, water meters are installed in each unit and provide a means for billing tenants directly for the water consumed in their unit.

Installation of water meters has a dramatic effect on lowering water-flow rates, and even when they do not, still it is allowing a fair billing of actual such usage.

The downside of the installation of per unit water-flow meters is that it has generally been practical only in buildings having a main distribution outlet for each housing or commercial unit being metered.

As mentioned above, many buildings and commercial centers are not plumbed this way. Instead, water in these facilities is supplied to each unit from multiple water risers serving numeral of distribution outlets (e.g., one at each floor, etc.). As a result, there are consistent attempts in the art to provide a metered monitoring system comprising the installation of multiple water meters—one for each outlet of any individual housing unit.

U.S. Pat. No. 5,986,573A discloses A method and apparatus for metering building structures having a plurality of service outlets each having control valves, includes the installation of meters within a given distance from each one of the valves. A transmission system is coupled electrically to each one of the meters for sending meter readings periodically to a remotely located equipment.

U.S. Pat. No. 5,892,158 discloses a method for installing a flow meter system and flow meter apparatus. The method includes using a flow meter system having a meter assembly and a transmitter device in conjunction with a utility distribution system disposed behind a wall in a space and having a conduit extending through a conduit opening in the wall for coupling a fixture thereto. The meter assembly is connected in fluid communication with the conduit and positioned outside of the space and in front of the wall. The transmitter device is installed within the space and positioned remotely from the meter assembly. The transmitter device is connected electrically to the transmitter device, and the fixture is coupled in fluid communication with the meter assembly, thereby concealing the meter assembly and the conduit opening.

CN107402051 discloses a flow recorder with a wireless monitoring function. The flow recorder comprises a signal collection and control circuit, a 3DR data transmission module, a PC computer, and client-side software. A current signal input interface of the signal collection and control circuit arranged outside is connected to a flow meter, and can collect current signal values of the flow meter; a control signal output interface of the signal collection and control circuit is connected to an electric regulation valve, and can output voltage signals to control the rotation of a servo motor; the PC can be arranged indoors and achieve communication work with the signal collection and control circuit through the 3DR data transmission module; the client-side software operates on the PC and completes record and display work of flow meter channel information and control the work of the electric regulation valve through a serial port.

All previous attempts to solve this problem have numerous drawbacks.

The need for either a hard to install wired communication or the need to rely on power consuming and range limited wireless communications, such as BT, WI-Fi, and the like, led to many faults. Among them the need to install the sensing module and the transmitting module in different places (i.e., in front and behind the wall) and the awkward and big structure of each meter. These drawbacks are emphasized by the need for power supply and by the tendency of tenants not to report or maintain faults in the meters, such as dead batteries, or other functional disfunction. In some cases, the tenants are motivated to tamper the meters in order to avoid water-flow charges.

SUMMARY OF THE INVENTION

It is, therefore, an object of the present invention to provide for a water-flow multi micro-meter system with a long-lasting power source.

It is another object of the present invention to provide for a water-flow multi micro-meter system with a tamper-proof character.

It is yet another object of the present invention to provide for a water-flow multi micro-meter system that is easy to install and remove by the landlord, yet hard to be removed by a tenant.

The system could be installed as a part of the construction or overall plumbing installation yet it could also be provided for DIY installation for owners or tenants.

The system comprises multiple micrometers designed to be connected to each water outlet within a housing or a commercial unit and measure the water-flow thereof.

Each of said multiple micrometers comprises a water-flow sensor, a transmission module, a processing unit, and a power unit.

The micrometer is designed to have a power-saving hibernating mode, in order to maintain a long-lasting battery lifespan.

Preferably the micrometer transmission module is based on a low-power wide-area network (LPWAN).

The Micrometer is designed to be mounted in a compact housing, attached on one side to the distributing conduit, and on the other side to the water-flow outlet or a pipe connection connected to said outlet. By being placed in the distributing system before each valve or another water outlet the micrometer could not be taken off without causing the water to flow out.

DESCRIPTION OF THE DRAWINGS

With specific reference now to the drawings in detail, it is stressed that the particulars shown are by way of example and for purposes of illustrative discussion of the embodiments of the invention. In this regard, the description taken with the drawings makes apparent to those skilled in the art how embodiments of the invention may be practiced, and the variety of usages enabled thereof.

FIG. 1 depicts an embodiment of the micrometer 22 according to the present invention. The micrometer 22 has a housing 62, The entrance end 642, is designed to be connected to a water distributing conduit, and flow through a tubular member to the exit end 644. The exit end 644 is designed to be connected to a water outlet 646. In this FIG. The water outlet is a shutter valve. The shutter valve 646 could be attached to said exit end 644, by any means like a thread a 'push-fit' or other. In some embodiments, the water outlet 646 could be permanently fixed to the micrometer, or even be manufactured as part of it.

The power-saving nature of the micrometer of the present invention provides the ability to mold the casing in a way that it is not openable, and therefore tamper-proof, and it could allow molding the micrometer housing, and other parts thereof with the water outlet as one piece.

FIG. 2 is an exploded view of an embodiment of the micrometer according to the present invention. The casing 22 covers a tubular member 64, the tubular member has an entrance end 642 designed to be connected to the distribution conduit, and through which the water enters the micrometer, and an exit end 644 designed to be connected to the water outlet or in the vicinity of a water outlet, and through which the water flows out of the micrometer. A rotating member 66 is located inside the tubular member, and in some embodiments, could be secured with two inserts 66a,b. The rotating member is designed to rotate upon the movement of water and allow to calculate the amount and pace of the water flow in accordance with said rotation.

The rotation is measured with a sensor 54. In this embodiment, the sensor 54 is magnet-based, thus it could be attached to the outer wall of said tubular member 64 using a sensor casing 54a. In a preferred embodiment of the present invention, the sensor is a Hall effect sensor, which allows for an efficient and manageable low power consumption and hibernation mode. It will be understood that any sensor able to sense the rotation of the rotating member is suitable for this invention. Regardless if it senses the rotation through the wall of the tubular member, located inside it, or having a wire connection through it.

The other components of the micrometer are assembled on a printed circuit board (PCB) 50, and a power unit 52 is connected to said PCB. When the housing is closed, it covers all parts, apart from the entrance end 642 and the exit end 644, which are extended outside.

FIG. 3 depicts an embodiment of the present invention. The micrometer 22 is assembled in the following manner: the entrance end 642 is connected to a water distributing conduit that passes through the wall 82. The micrometer is covered by the housing 62 and connected through the exit end 644 to a water outlet 646, in this Figure, a showerhead. The connection of both ends could be threaded, 'push-fit', or any other plumbing connection. The showerhead could be assembled to the exit end or be manufactured with it as one piece or as a separable component. The nature of the invention as a battery saver micrometer allows to install the micrometer on the other side of the wall 82, within the wall or even outside the building, as long as the exit end connected to a conduit or pipe that is closely connected or connectable to the water outlet.

FIG. 4 shows yet another embodiment of the present invention. In this configuration, the water outlet 646 is a faucet. The body of said faucet is the housing of the micrometer. The tubular member 64 is located within said faucet body, and the entrance end is the entrance of the said faucet. Said entrance is connected to the water distributing system. The PCB 50 is located within said faucet body, and the exit end 644 is connected to the water exit of said faucet. Similar configurations can be applied with other water outlet components such as showerheads, toilet tank valves, and others.

FIG. 5a,b shows a configuration of both sides of a PCB 50, according to some embodiments of the present invention. The main processor 58 controls the overall operation of the micrometer. The power unit comprises a battery being connected to the power connector 524, and feed the micrometer through a voltage regulator 526. The sensor is connected to the PCB 50 through a sensor connector 54b. The transmission module 56 is controlling all data traffic from and to the micrometer, using an antenna 562. In this configuration, there is a protection diode 582 aimed to protect the circuit from a reverse current or voltage. In this configuration, there is also a flash memory unit 56 capable of various tasks such as recording hardware serial number for securing the system from hacking or cloning, allowing an over the air (OTA) firmware or software update, or used to store inner data, to be transmitted as part of the system functions.

FIG. 7 is a schematic view of the water consumption monitoring system. The system comprises multiple micrometers 22 installed in the multi-unit complex. The micrometers 22 are connected in a wireless transmission mean to a gateway 42. The gateway is connected to a server 44 either directly or through a cloud 66 or another computer network.

DETAILED DESCRIPTION OF THE EMBODIMENTS

Some embodiments of the invention are herein described, by way of example only, with reference to the accompanying drawings.

The present invention relates to a system to monitor water consumption within a housing or business unit located in a complex contains a plurality of such units.

The system is based on a micrometer installed in the vicinity of each water outlet within said unit. In this specification, the term outlet refers to an endpoint of a distributing conduit of water, which includes all different types of water consumers or distributors such as showerheads, toilets, taps, valves, or others.

The micrometer of the present invention is designed to have a long battery lifespan in order to avoid the need to open, remove, reassemble or physically intervene with it after installing and for the entire lifespan of the micrometer itself.

The main characteristic allowing such a long battery lifespan is based on a hibernation mode in which the micrometer shuts all or part of its power usage processes.

It is emphasized that in this specification, the term Hibernation includes both technical state of hibernation mode and sleep mode, as well as any other mode intended to lower or shut off power-consuming elements or processes.

The micrometer 22 of the present invention comprises a housing, a tubular member, a rotating member, a power unit, a sensor, a transmission module, and a processor.

Figure 1:
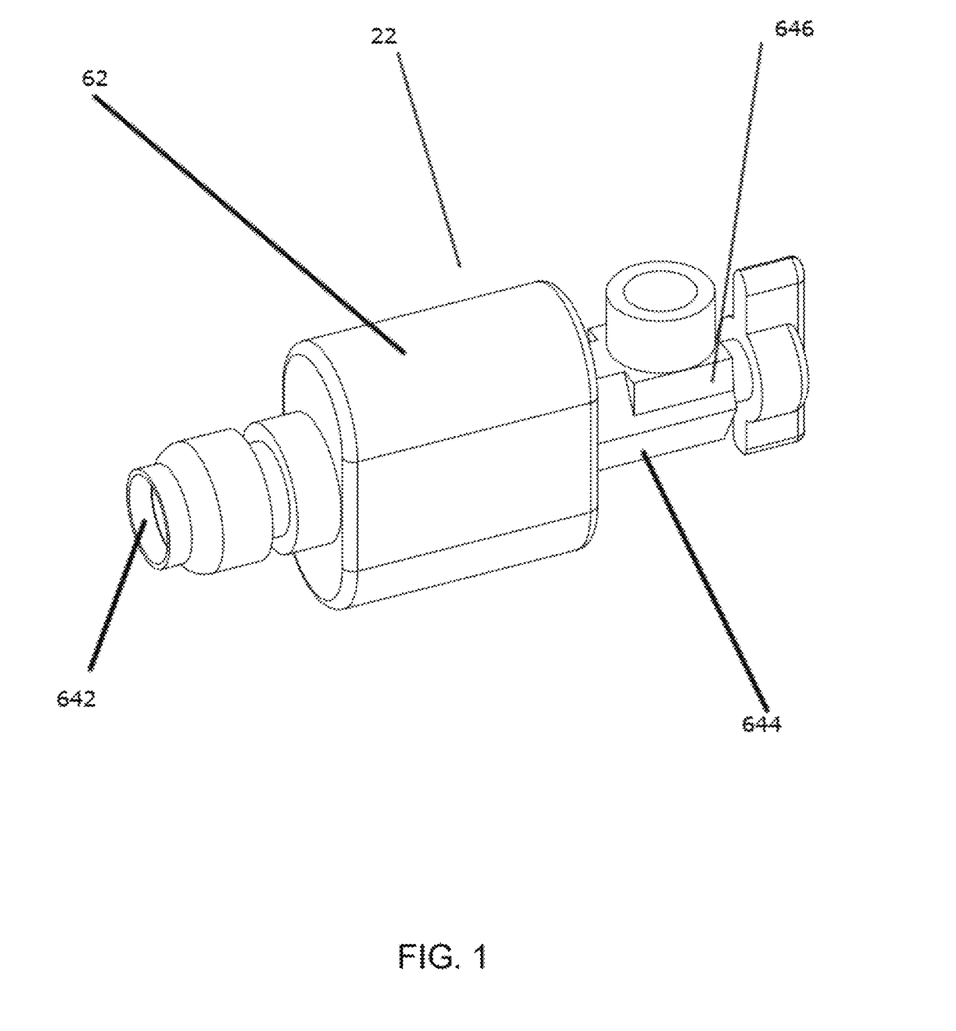
Figure 2:
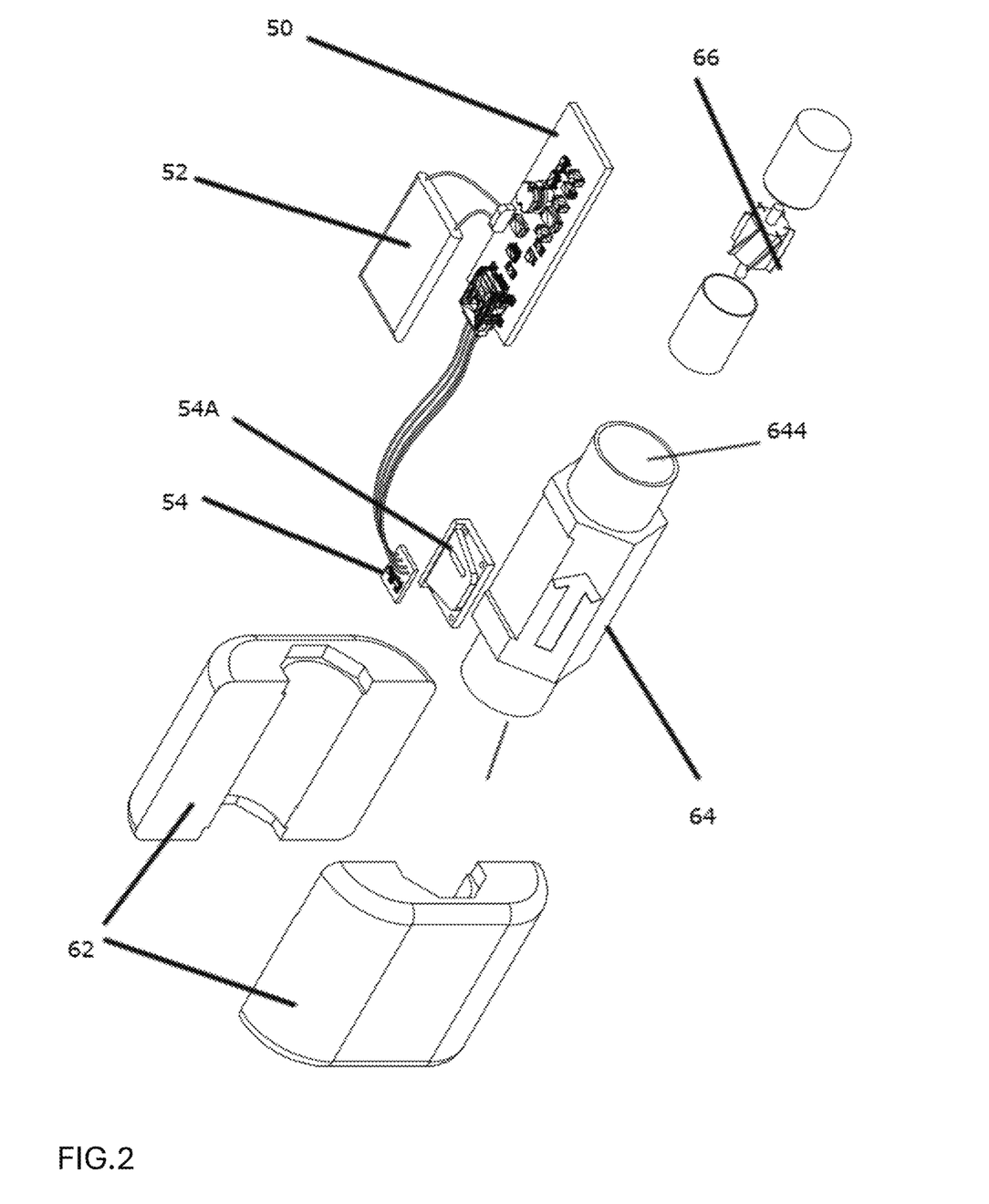
Figure 3:
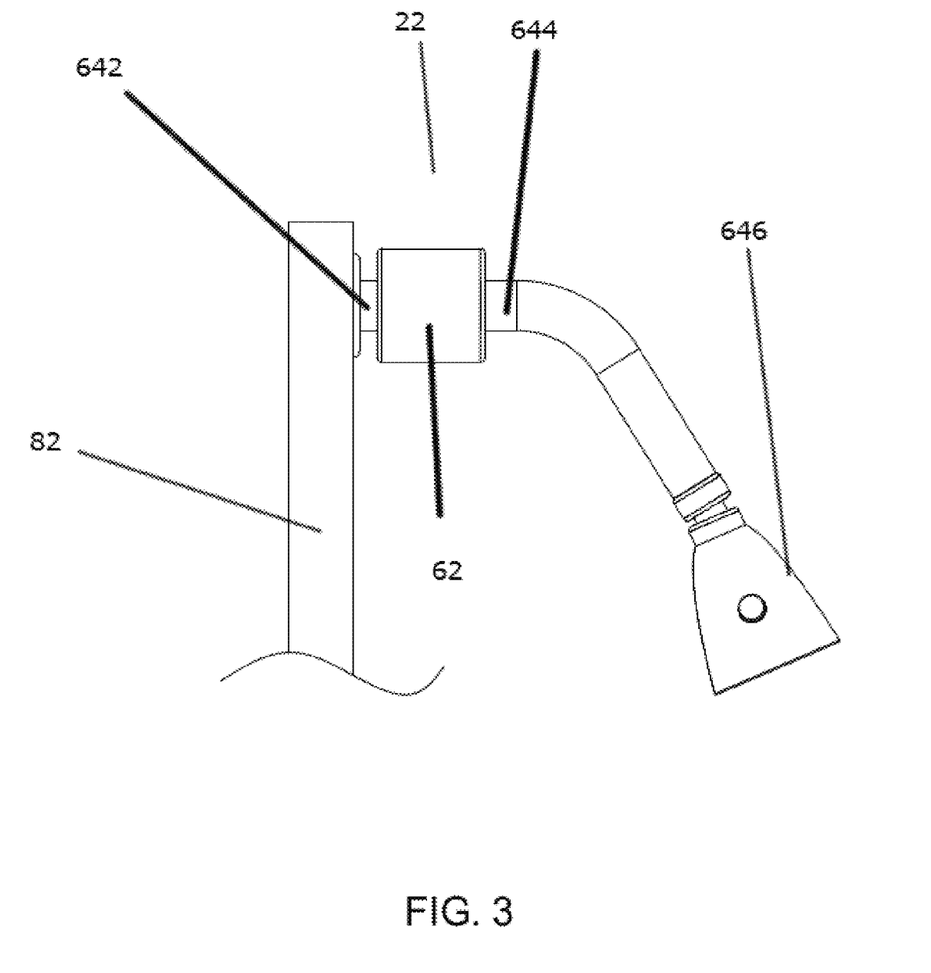
Figure 4:
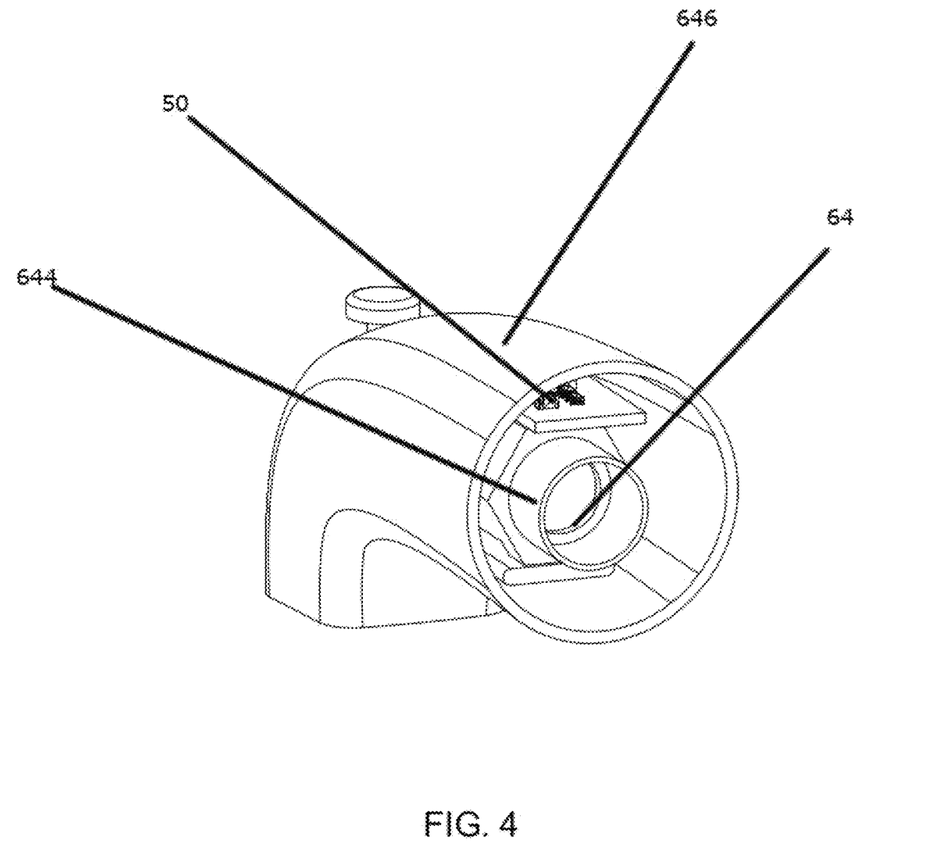

The housing 62 is the outer envelope of the micrometer. It is designed to keep the components safe and function and allows for easy installment and removal of the micrometer by an authorized party. In some embodiments of the present invention, the housing is designed to have a tamper-proof feature. This is due to the main characteristic of the micrometer—being a low voltage consuming and having a hibernation mode, and as a result, having a very long battery life-span. Because there is no need for battery replacement, the housing could be made in a manner that is not openable or having another tamper-proof mean such as breakable component, alerting function, or other.

The housing could be manufactured by molding or assembling, and it could be made of plastic, rubber, metal, or other materials in accordance with the specific manner of usage.

The tubular member 64 is the inner water path of the micrometer. It isdesigned to house the rotating member and is connected or connectable to the water distributing conduit with the entrance end 642 and to a water outlet with the exit end 644.

The rotating member 66 is designed to rotate upon movement of water. In some embodiments of the invention, the rotating member is designed with a special effort to minimize its effect on the water flow stream.

In a preferred embodiment of the present invention, the initial motion of the rotating member is used to terminate the hibernation mode of the micrometer. In some embodiments of the present invention, the rotating member houses the sensor 54, or components thereof, while in a preferred embodiment it is a separate member. It could be made of any material and could have part or all of it, magnetized or magnet sensitive. In other embodiments, it could contain means to exploit water movement into power generating.

The sensor 54 senses the rotation of the rotating member 66 and could be located anywhere inside the tubular member 64 or on its outer wall. It could have a wire going through the wall of the tubular member, yet in preferred embodiments of the present invention, the sensor is magnet-based and could be attached to the tubular member's outer wall and measure the rotation of the rotating member through it.

In preferred embodiments of the present invention, the sensor is a Hall effect sensor, and is designed to work with low power consumption and allows for a hibernation mode.

Figure 5A:
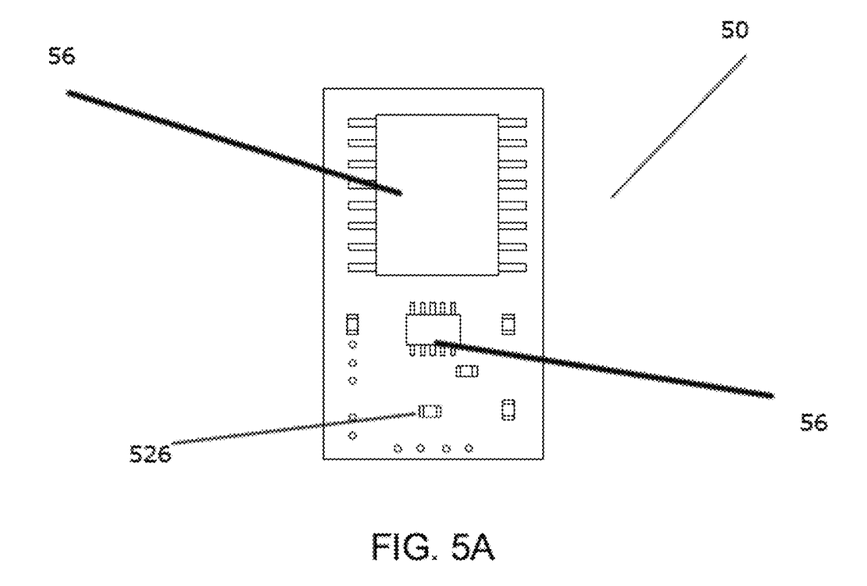
Figure 5B:
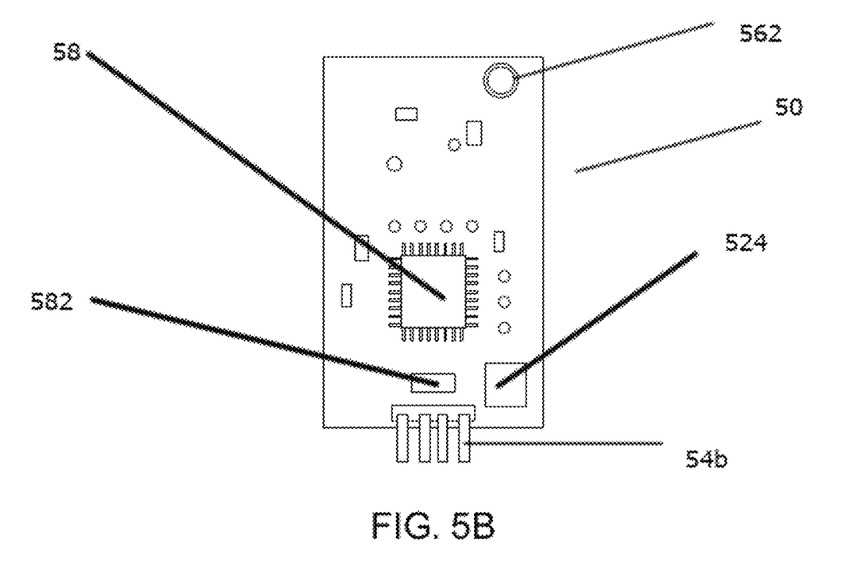
Figure 6:
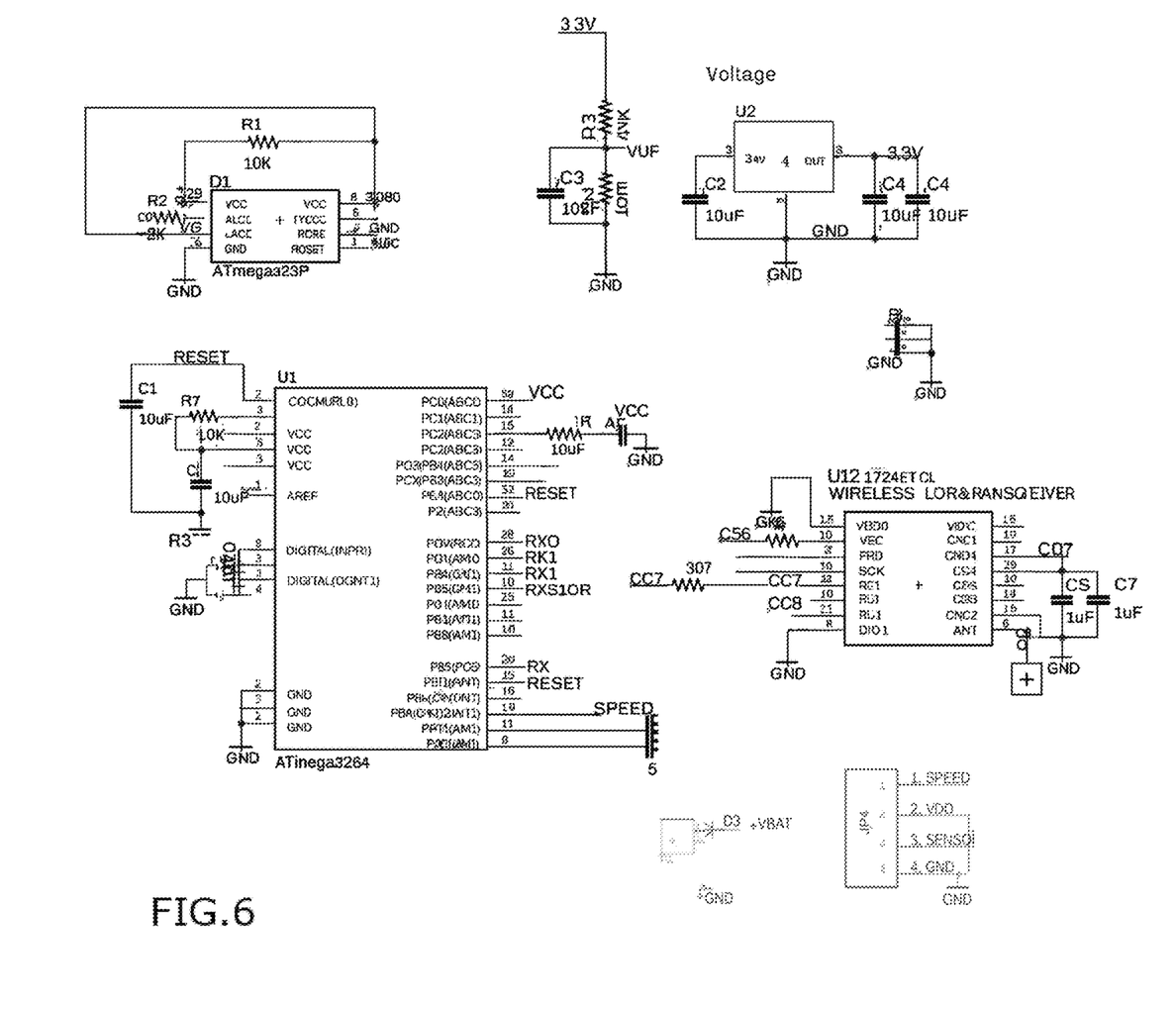
FIG. 6 is a detailed specification of an example of an architecture of the present invention.

The power unit could be any power source. Typically it will be a battery 52. In preferred embodiments of the present invention, the power unit further comprises a voltage regulator 526. The voltage regulator provides stable voltage for the micrometer while battery consumption is kept low. Another advantage of having a voltage regulator regards the hibernation mode. Some voltage regulators perform the hibernation function and allowing the main processor and other components to be shut wholly or almost entirely.

The transmission module 56 is wireless communication components. It designed to transmit and receive data from and to the system. In preferred embodiments of the present invention, the transmission module is a low-power wide-area network (LPWAN) this type of wireless communication is long-range and low power consuming, thus suits best for the internet of things (IoT) usage. The LPWAN transmission module could be any of the known platforms such as DASH7, WeightLess, LoRa, Sigfox, or other.

The advantage of using an LPWAN module is based on two features. Low power consumption allows for long battery life and therefore enables tamper-proof features, both in the structure of the micrometer and in the choice of location (e.g., behind walls). Long-range also allows for a broader range of locations and enhances communication of the system throughout the entire complex of units. Nevertheless, it will be understood to those skilled in the art that any wireless technology is suited and comply with the present invention.

The processor 58 is a central processing unit (CPU), and preferably a microprocessor unit. It could have internal or external random access memory (RAM) and optionally have a read-only memory (ROM). Said memory functions could be used for self functions and for controlling the entire micrometer functionality. In some embodiment, the processor 58 performs the hibernation procedures, after switching other components into sleep mode, Yet in the preferred embodiments of the present invention the processor is setting other parts to sleep mode but the entire hibernation function is set by the voltage regulator 526, that set the main processor itself into sleep mode.

The hibernation mode of the present invention is a state where some or most components of the micrometer are lowering their power consumption to a minimum. On some preferred embodiments, some of the components completely shut down the voltage consumption.

Entering the hibernation mode and terminating it could be in accordance with predefined parameters. Such parameters could be a time gap from last known water flow through the micrometer, a predefined time of the day, the week, the month or the year. The time could be defined manually or could be generated by the system, analyzing the personal data of the specific unit, or big data from overall system users.

The micrometer terminates the hibernation mode and wakes up its components as a response to the rotation of the rotating member, i.e., as a result of a water-flow through the micrometer and to the specific water outlet. This could be achieved either by a mechanical response to the motion of the rotating member, such as switching or touching a component, through the conversion of movement into an electric signal or by the sensor sensing said motion.

As described below, the hibernation mode could be controlled by the main processor, yet in preferred embodiments of the present invention, it is controlled by a voltage regulator. This configuration allows for even lower power consumption and contributed to the overall life span of the battery and the micrometer as a whole.

Figure 7:
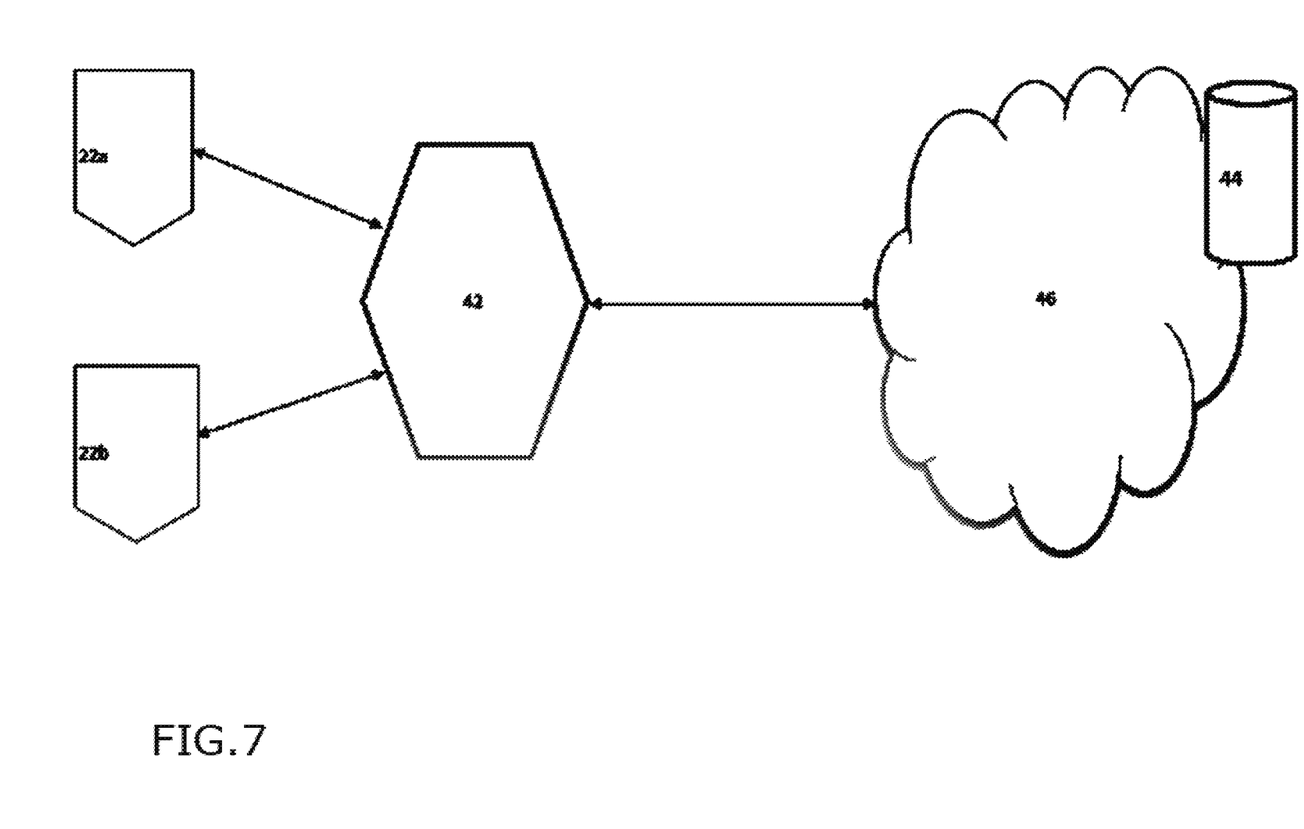

The system of the present invention includes multiple micrometers 22 as described, a gateway 42, and a server 44. The micrometers 22 are installed on each water outlet of every unit in the complex, and the gateway is designed to communicate with all the micrometers. Sometimes, when specific conditions require, there are a few gateways that communicate with some of the micrometers each. The gateway is compatible with the transmission module. In preferred embodiments of the present invention, the technology used for said communication is an LPWAN technology. Being a low power, wide range and small packet technology ensure that each gateway could handle a large number of micrometers and cover a wide area (both horizontally and vertically).

The gateway is connected to a server that runs the system database and software applications. The connection between the gateway and the server could be direct or through a cloud or other network.

The system is used to supply data of water usage on a unit or water outlet basis. Such data could be real-time data (e.g., alerts of leakage, water limits or overall consumption) or billing data. The system could use the data and analyze it. said analysis could be per individual unit or water outlet or be done on big-data basis. Said analysis could help design demand and usage planning, or other purposes as known in the art.

An Example of a Configured Architecture

Architecture and configuration of a system according to some embodiments of the present invention is set forth herein by way of example and not limitation.

The power unit of this configuration comprises a battery and a voltage regulator. The battery is connected to a PCB and supply voltage to an Ultra-low standby voltage regulator known commercially by the name MCP1700. Said voltage regulator provides a regulated voltage at 3.3 VDC for the entire system. The main characteristic of MCP1700 is very low standby current. The MCP1700 microchip regulator is designed to allow the control of the hibernation function, and therefore allows the main processor to shut off at hibernation mode.

The sensor is an ultra-low-power consumption Hall Effect sensor known commercially as DRV5012. This sensor measures the rotation of the rotating member and is used to calculate the flow. The rotation is metered by a magnetic part of the rotating member that affects the magnet sensitive sensor. When a south magnetic pole is near the top of the package, and the BOP threshold is exceeded, the device drives a low voltage. The output stays low until a north pole is applied, and the BRP threshold is crossed, which causes the output to drive a high voltage. Using an internal oscillator, the DRV5012 device samples the magnetic field and updates the output at a rate of 20 Hz or 2.5 kHz, depending on the SEL pin. This dual-bandwidth feature can allow systems to monitor changes in movement while using minimal power. The main advantage of this sensor is—it has four pins (while regular sensor has only 3), which enable software configurable to toggle between ultra-low-power in sleep/idle mode and high-frequency working mode to measure the flow rate more accurate. This last feature is of significant importance in this featured architecture since the sensor is required to sense the initial motion of the rotating member and kick off the termination of the hibernation mode.

The transmission module is known commercially as LoRa 1276-C1 module. It is used to send/receive data to a compatible LoRa Gateway. This module is kept in a deep sleep before main processor entering sleep mode. This technology has very low power consumption and could be further put to sleep to extinct, the power consumption completely. Because much energy is consumed when submitting data and LoRa limits data submission through regulation of data flow intervals, the interval between communication sessions of the system is limited by user-configurable submit interval value (1 to 1440 minutes, default to be 120 minutes).

The main processor is known commercially by the name ATMega328P-AU. The main processor controls all the activities of the micrometer components. The main processor is kept in deep sleep most of the time. It uses interrupt to wake up only when there is a flow, thus minimized the power consumption. Before entering the hibernation mode, the main processor puts the sensor DRV5012 in low power mode and the transmission LoRa and optionally a serial flash memory into sleep mode.

In this architecture there is optionally a Serial Flash component, it could be used to store the hardware serial code for securing the operation of the system, or as a platform for OTA (e.g., hibernation data, software and firmware updates or configuration attributes): The flash memory is used by the main processor.

The invention claimed is:

1. A micrometer for water-flow monitoring comprising:
   a housing;
   an inner tubular member, said inner tubular member is located inside said housing, and has an entrance end and an exit end, wherein said entrance end is connected to a distributing conduit, and the exit end is connected to or in a vicinity of a water-flow consumption outlet, in a manner that said tubular member continues the water path of said distributing conduit;
   a rotating member, said rotating member is designed to rotate upon the flow of water through said tubular member;
   a sensing module, said sensing module is sensing the amount of water flow through said micrometer to said water-flow outlet, in accordance with the rotation of said rotating member;
   a communication module, said communication module is designed to transmit, receive and control data traffic from and to said micrometer;
   a power unit; and
   a processor,
   wherein said micrometer is operable in a hibernation mode, wherein said hibernation mode starts according to a predefined instructions received through said communication module and is terminated upon the flow of water, by the movement of said rotating member, sensing of said sensing module, or a combination thereof.

2. The micrometer for water-flow monitoring of claim 1, wherein said communication module is a low-power wide-area network (LPWAN).

3. The micrometer for water-flow monitoring of claim 1, wherein said power unit comprising a battery and a voltage regulator.

4. The micrometer for water-flow monitoring of claim 1, wherein said sensing module is a magnet-based sensor.

5. The micrometer for water-flow monitoring of claim 1, wherein said housing has a tamper-proof feature.

6. The micrometer for water-flow monitoring of claim 1, wherein said housing is part of a water outlet.

7. The micrometer for water-flow monitoring of claim 1, wherein said exit end is permanently connected to said water outlet.

8. The micrometer for water-flow monitoring of claim 1, further comprising a flash memory.

9. The micrometer for water-flow monitoring of claim 1, wherein said hibernation mode is controlled by one or more of said sensing module, communication module, power unit, or processor.

10. The micrometer for water-flow monitoring of claim 1, wherein said hibernation mode sets one or more of said sensing module, communication module, power unit, or processor to shut off or operate in lower power consumption.

11. The micrometer for water-flow monitoring of claim 1, wherein said hibernation mode shuts off one or more of said sensing module, communication module, power unit, or processor.

12. A system for water-flow monitoring comprising:
at least one micrometer of claim 1, a gateway, and a server,
wherein said at least one micrometer is capable of transmitting data from and to said gateway, and
wherein said gateway is capable of transmitting data from and to said server.

13. The system for water-flow monitoring of claim 12, designed to collect, analyze, and report water-flow data.

14. The system for water-flow monitoring of claim 12, designed to alert in real-time upon predefined events.

15. The system for water-flow monitoring of claim 14, wherein said predefined events are selected from water leakage, water quantity limit, micrometer tamper, or any combination thereof.

16. The system for water-flow monitoring of claim 12, designed to manage billing of water usage.

17. The system for water-flow monitoring of claim 12, designed to send a signal to an automatic valve to shut off a leakage.

18. The system for water-flow monitoring of claim 12, designed to locate water leakage by way of comparing the amount of water between several micrometers located in specific routes of water distribution.

19. A micrometer for water-flow monitoring comprising:
a housing;
an inner tubular member, said inner tubular member is located inside said housing, and has an entrance end and an exit end, wherein said entrance end is connected to a distributing conduit, and the exit end is connected to or in a vicinity of a water-flow consumption outlet, in a manner that said tubular member continues the water path of said distributing conduit;
a rotating member within said inner tubular member, said rotating member is designed to rotate upon the flow of water through said tubular member;
a sensing module, said sensing module is sensing the amount of water flow through said micrometer to said water-flow outlet, in accordance with the rotation of said rotating member;
a communication module, said communication module is designed to transmit, receive and control data traffic from and to said micrometer, wherein said communication module is a low-power wide-area network (LP-WAN);
a power unit comprising a battery and a voltage regulator; and
a processor,
wherein the sensing module, communication module, power unit, and processor are all located within the housing, and wherein the housing is part of a water outlet.

* * * * *